US009898931B1

(12) United States Patent
Nickolaou (10) Patent No.: US 9,898,931 B1
(45) Date of Patent: Feb. 20, 2018

(54) METHOD AND APPARATUS FOR DETECTING HAZARDS AND TRANSMITTING ALERTS

(71) Applicant: GM GLOBAL TECHNOLOGY OPERATIONS LLC, Detroit, MI (US)

(72) Inventor: James N. Nickolaou, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/275,652

(22) Filed: Sep. 26, 2016

(51) Int. Cl.
*G08G 1/16* (2006.01)
*G08G 1/123* (2006.01)
*H04L 29/08* (2006.01)
*G08G 1/0967* (2006.01)

(52) U.S. Cl.
CPC ....... *G08G 1/167* (2013.01); *G08G 1/096791* (2013.01); *G08G 1/123* (2013.01); *H04L 67/12* (2013.01)

(58) Field of Classification Search
CPC .. G08G 1/167; G08G 1/096791; G08G 1/123; H04L 67/12
USPC .......................................... 701/119, 300–302
See application file for complete search history.

(56) References Cited

U.S. PATENT DOCUMENTS

| 7,825,824 | B2* | 11/2010 | Shrum, Jr. ............. G08G 1/127 340/506 |
| 8,155,865 | B2* | 4/2012 | Bicego, Jr. ......... G01C 21/3691 340/539.13 |
| 8,532,862 | B2* | 9/2013 | Neff ...................... G05D 1/0231 180/167 |
| 8,907,814 | B2* | 12/2014 | Chen ................ G08G 1/096716 340/901 |
| 8,947,218 | B2* | 2/2015 | Yoshizawa ................ B60R 1/00 340/435 |
| 2007/0096892 | A1* | 5/2007 | Nathan .................. G08G 1/161 340/471 |
| 2007/0150140 | A1* | 6/2007 | Seymour ................ G07C 5/008 701/33.4 |
| 2008/0125972 | A1* | 5/2008 | Neff ...................... B60W 40/02 701/300 |
| 2008/0262670 | A1* | 10/2008 | McClellan ............ G01S 5/0027 701/31.4 |
| 2009/0234859 | A1* | 9/2009 | Grigsby ................. G08G 1/161 |
| 2010/0250106 | A1* | 9/2010 | Bai .................. G08G 1/096716 701/117 |
| 2010/0305804 | A1* | 12/2010 | Taguchi .................... G06F 7/00 701/31.4 |
| 2011/0043377 | A1* | 2/2011 | McGrath ............ G08G 1/09675 340/905 |
| 2011/0084824 | A1* | 4/2011 | Tewari ............... B60H 1/00771 340/438 |
| 2011/0112720 | A1* | 5/2011 | Keep ...................... B60R 16/02 701/36 |
| 2011/0251752 | A1* | 10/2011 | DeLarocheliere ..... G07C 5/008 701/31.4 |

(Continued)

*Primary Examiner* — Tyler J Lee (57) ABSTRACT

A method and apparatus for detecting a vehicle hazard are provided. The method includes: detecting a second vehicle based on information received from at least one sensor of a first vehicle; determining whether the second vehicle presents a hazard based on the information received from the at least one sensor of the first vehicle; and transmitting a notification alerting of the second vehicle if it is determined that the second vehicle presents a hazard.

19 Claims, 5 Drawing Sheets

(56) References Cited

U.S. PATENT DOCUMENTS

| | | | |
|---|---|---|---|
| 2012/0229302 A1* | 9/2012 | Sri-Jayantha | G08G 1/0112 340/905 |
| 2013/0093886 A1* | 4/2013 | Rothschild | G08G 1/0175 348/148 |
| 2013/0282267 A1* | 10/2013 | Rubin | G08G 9/02 701/301 |
| 2014/0009307 A1* | 1/2014 | Bowers | G08G 1/166 340/901 |
| 2014/0012492 A1* | 1/2014 | Bowers | G08G 1/16 701/301 |
| 2014/0032094 A1* | 1/2014 | Heinrichs-Bartscher | B60T 7/22 701/301 |
| 2014/0358841 A1* | 12/2014 | Ono | G08G 1/0112 706/52 |
| 2015/0161892 A1* | 6/2015 | Oremus | G08G 1/165 340/901 |
| 2016/0148511 A1* | 5/2016 | Shibata | G08G 1/162 701/119 |
| 2017/0213462 A1* | 7/2017 | Prokhorov | G08G 1/096791 |
| 2017/0262709 A1* | 9/2017 | Wellington | G06K 9/00791 |
| 2017/0268896 A1* | 9/2017 | Bai | G01C 21/36 |

\* cited by examiner

FIG. 5

METHOD AND APPARATUS FOR DETECTING HAZARDS AND TRANSMITTING ALERTS

INTRODUCTION

Apparatuses and methods consistent with exemplary embodiments relate to detecting hazards and transmitting alerts. More particularly, apparatuses and methods consistent with exemplary embodiments relate to detecting hazardous vehicles or hazardous vehicle operations and transmitting alerts regarding hazardous vehicles or hazardous vehicle operations.

SUMMARY

One or more exemplary embodiments provide a method and an apparatus that detects hazardous vehicles or hazardous driving of a vehicle based information received from vehicle sensors. More particularly, one or more exemplary embodiments provide a method and an apparatus that detects hazardous vehicles on the road based information received from vehicle sensors and transmits alerts regarding the hazardous vehicles to the appropriate authority.

According to an aspect of an exemplary embodiment, a method for detecting a hazardous vehicle. The method includes: detecting a second vehicle based on information received from at least one sensor of a first vehicle; determining whether the second vehicle presents a hazard based on the information received from the at least one sensor of the first vehicle; and transmitting a notification alerting of the second vehicle if it is determined that the second vehicle presents a hazard.

The determining whether the second vehicle presents the hazard may be performed based on at least one from among information corresponding to a lane position of a second vehicle, information corresponding to a speed and a braking of a second vehicle, information corresponding to a vigilance of a second vehicle, and information corresponding to a performance of a driver of a second vehicle. The determining whether the second vehicle presents the hazard may also be performed based on a weighted average of the aforementioned information.

The information corresponding to lane position of the second vehicle may include information on at least one from among weaving of a second vehicle, weaving across lines by a second vehicle, straddling a line by a second vehicle, swerving by a second vehicle, a wide radius turn by a second vehicle, drifting by a second vehicle and near collisions by a second vehicle.

The information corresponding to the speed and the braking of the second vehicle may include information on at least one from among stopping positions of a second vehicle, acceleration and deceleration of a second vehicle, speed variance of a second vehicle, a difference between a speed of a second vehicle and a posted speed limit.

The information corresponding to the vigilance of the second vehicle may include information on at least one from among a response time of a second vehicle to a traffic control device, a status of lights of a second vehicle at a time of a day, signaling by a second vehicle, and a direction of travel relative to a posted direction of travel.

The information corresponding to the performance of the driver of the second vehicle may include information on at least one from among a distance between a second vehicle and a third vehicle, illegal turns by a second vehicle, and a path of a second vehicle.

The transmitting the notification alerting of the second vehicle may include: outputting a notification notifying of the hazard of the second vehicle to a device; receiving an input from the device indicating whether to contact authorities; and transmitting a notification notifying of the hazard of the second vehicle to the authorities if the input requests that the authorities be contacted.

The transmitting the notification alerting of the second vehicle may include transmitting a notification alerting of the hazard of the second vehicle to appropriate authorities.

According to an aspect of another exemplary embodiment, an apparatus for detecting a hazard is provided. The apparatus includes at least one memory comprising computer executable instructions; and at least one processor configured to read and execute the computer executable instructions, the computer executable instructions causing the at least one processor to: detect a second vehicle based on information received from at least one sensor of a first vehicle; determine whether the second vehicle presents a hazard based on the information received from the at least one sensor of the first vehicle; and transmit a notification alerting of the second vehicle if it is determined that the second vehicle presents a hazard.

The apparatus may further include at least one sensor including at least one from among at least one camera, a radar, a LIDAR, and a laser sensor.

According to an aspect of another exemplary embodiment, a non-transitory computer readable medium comprising computer executable instructions executable by a processor to perform the method for detecting a hazard is provided. The method includes: detecting a second vehicle based on information received from at least one sensor of a first vehicle; detecting identification information of the second vehicle; determining whether the second vehicle presents a hazard based on the information received from the at least one sensor of the first vehicle; and transmitting a notification alerting of the second vehicle if it is determined that the second vehicle presents a hazard, the notification including identification information of the second vehicle.

Other objects, advantages and novel features of the exemplary embodiments will become more apparent from the following detailed description of exemplary embodiments and the accompanying drawings.

DETAILED DESCRIPTION

An apparatus and method that detect a hazardous vehicle will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or combined into one or more devices. In addition, individual elements may be provided on separate devices.

As additional sensors are added to vehicles to monitor an external environment of a vehicle or machine, information from the sensors may be used to detect hazards or issues present in the external environment. These hazards may include hazards presented by other vehicles or machines and drivers of other vehicles or machines as well as road conditions or road obstacles. The hazards or issues in the external environment that are detected from the information may then be addressed by occupants or operators of the vehicle or machine, or by automated systems designed to address hazards or issues.

Figure 1:
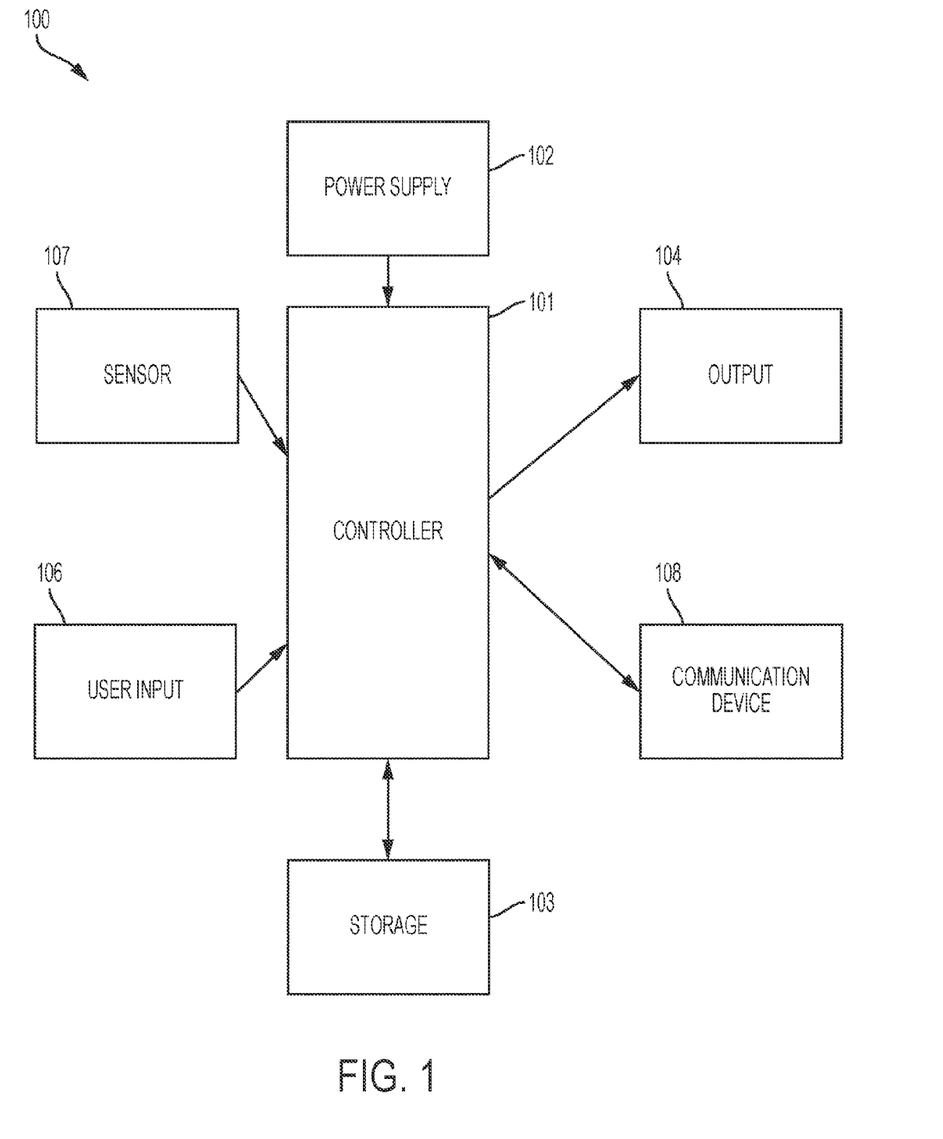
FIG. 1 shows a block diagram of an apparatus that detects a hazardous vehicle according to an exemplary embodiment.

FIG. 1 shows a block diagram of an apparatus for detecting a hazardous vehicle 100 according to an exemplary embodiment. As shown in FIG. 1, the apparatus for detecting a hazardous vehicle 100, according to an exemplary embodiment, includes a controller 101, a power supply 102, a storage 103, an output 104, a user input 106, a sensor 107, and a communication device 108. However, the apparatus for detecting a hazardous vehicle 100 is not limited to the aforementioned configuration and may be configured to include additional elements and/or omit one or more of the aforementioned elements. The apparatus for detecting a hazardous vehicle 100 may be implemented as part of a vehicle, as a standalone component, as a hybrid between an on vehicle and off vehicle device, or in another computing device.

The controller 101 controls the overall operation and function of the apparatus for detecting a hazardous vehicle 100. The controller 101 may control one or more of a storage 103, an output 104, a user input 106, a sensor 107, and a communication device 108 of the apparatus for detecting a hazardous vehicle 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the sensor 107, and the communication device 108 of the apparatus for detecting a hazardous vehicle 100. The information may be sent and received via a bus or network, or may be directly read or written to/from one or more of the storage 103, the output 104, the user input 106, the sensor 107, and the communication device 108 of the apparatus for detecting a hazardous vehicle 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the user input 106, the sensor 107, and the communication device 108 of the apparatus for detecting a hazardous vehicle 100. The power supply 102 may include one or more from among a battery, an outlet, a capacitor, a solar energy cell, a generator, a wind energy device, an alternator, etc.

The storage 103 is configured for storing information and retrieving information used by the apparatus for detecting a hazardous vehicle 100. The storage 103 may be controlled by the controller 101 to store and retrieve information received from the sensor 107. The information may include information on a second vehicle detected by the sensor 107. The second vehicle may be a vehicle other than the vehicle that includes the apparatus for detecting a hazardous vehicle 100. As one example, the information may include one or more from among information corresponding to a lane position of a second vehicle, information corresponding to a speed and a braking of a second vehicle, information corresponding to a vigilance of a second vehicle, and information corresponding to a performance of a driver of a second vehicle. The storage 103 may be controlled by the controller 101 to store and retrieve weights corresponding the aforementioned information. The weights may include weights determined based on a dynamic weighted time scale (e.g., weights that depend on a situation and a time period). The storage 103 may also include the computer instructions configured to be executed by a processor to perform the functions of the apparatus for detecting a hazardous vehicle 100.

According to one example, the information corresponding to lane position of the second vehicle may include information on at least one from among weaving of a second vehicle, weaving across lines by a second vehicle, straddling a line by a second vehicle, swerving by a second vehicle, a wide radius turn by a second vehicle, drifting by a second vehicle and near collisions by a second vehicle. According to another example, the information corresponding to the speed and the braking of the second vehicle may include information on at least one from among stopping positions of a second vehicle, acceleration and deceleration of a second vehicle, speed variance of a second vehicle, a difference between a speed of a second vehicle and a posted speed limit. According to yet another example, the information corresponding to the vigilance of the second vehicle may include information on at least one from among a response time of a second vehicle to a traffic control device, a status of lights of a second vehicle at a time of a day, signaling by a second vehicle, and a direction of travel relative to a posted direction of travel. In addition, the information corresponding to the performance of the driver of the second vehicle may include information on at least one from among a distance between a second vehicle and a third vehicle, illegal turns by a second vehicle, and a path of a second vehicle.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus for detecting a hazardous vehicle 100. The output 104 may include one or more from among a speaker, audio, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may include information notifying of the hazard of the second vehicle to a device as well as graphical indicators indicating the type of hazard presented by the second vehicle.

The user input 106 is configured to provide information and commands to the apparatus for detecting a hazardous vehicle 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to cycle through notifications or different screens of a notification. In yet another example, the user input 106 may be used by the user to initiate communication to request authorities, emergency responders, etc., as well as to communicate with an operator at a call center to make the request.

The sensor 107 may include one or more from among a plurality of sensors including a camera, a laser sensor, an ultrasonic sensor, an infrared camera, a LIDAR, a radar sensor, and a microwave sensor. The sensor 107 may provide hazard information on hazards external to the vehicle such as a second vehicle, an obstacle, a road condition, a weather condition, etc. The hazard information may indicate one or more from among a type of hazard, positions of a hazard, and a speed of a hazard. The sensor 107 may also provide information identifying the external hazards. The hazard information may be sent to the controller 101 via a bus, storage 103 or communication device 108. For example, the controller 101 may process information on positions of a hazard and speed of a hazard to determine that a second vehicle is speed or is not staying in its lane. The controller 101 may then control to send information identifying the hazard to appropriate authorities along with other information such as location, hazard type, etc.

According to an example, oscillation performance, a defect, or an issue of a second vehicle that is not expected may be detected as a hazard. Moreover, the second vehicle may be an autonomous vehicle. If it is determined that the second vehicle is an autonomous vehicle and a hazard requiring repair is detected, the controller may control to send information identifying the hazard to appropriate authorities along with other information such as location, hazard type, vehicle identification etc. The autonomous vehicle may then be recalled for repairs by a dispatch center receiving the notification and the hazard may be repaired. Alternatively, the information may be sent to the autonomous vehicle and the vehicle can make the determination to navigate to a location for repairs.

The communication device 108 may be used by apparatus for detecting a hazardous vehicle 100 to communicate with various types of external apparatuses according to various communication methods. The communication device 108 may be used to send/receive hazard information to/from the controller 101 of the apparatus for detecting a hazardous vehicle 100. The communication device 108 may also be configured to transmit the notification of hazard or hazardous vehicle, identification information of hazard or hazardous vehicle, and/or location information corresponding to the hazard or hazardous vehicle, etc., to a mobile device such as mobile phone, smart watch, laptop, tablet, etc. so that the notification is output by the mobile device. Moreover, the communication device 108 may transmit the notification of hazard or hazardous vehicle, identification information of hazard or hazardous vehicle, and/or location information corresponding to the hazard or hazardous vehicle, to a law enforcement agency, emergency responders, a call center, a transportation service, a family member, or other designated contact, along with location information indicating a location of a first vehicle that detects the hazard. The location information may be determined from information received from a global positioning system (GPS) receiver.

The communication device 108 may be provide both voice and data communication. By providing both voice and data communication, the communication device 108 enables the vehicle to offer a number of different services including those related to navigation, telephony, emergency assistance, diagnostics, infotainment, etc. Data can be sent either via a data connection, such as via packet data transmission over a data channel, or via a voice channel. For combined services that involve both voice communication (e.g., with a live advisor or voice response unit at a call center) and data communication (e.g., to provide GPS location data or vehicle diagnostic data to the call center), the system can utilize a single call over a voice channel and switch as needed between voice and data transmission over the voice channel.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, EVDO, CDMA, GPRS, EDGE or ZigBee.

According to another exemplary embodiment, the controller 101 of the apparatus for detecting a hazardous vehicle 100 may be configured to detect a second vehicle based on information received from at least one sensor of a first vehicle, determine whether the second vehicle presents a hazard based on the information received from the at least one sensor of the first vehicle, and transmit a notification alerting of the second vehicle if it is determined that the second vehicle presents a hazard.

According to an exemplary embodiment, the controller 101 of the apparatus for detecting a hazardous vehicle 100 is configured to detect a second vehicle based on information received from at least one sensor of a first vehicle, detect identification information of the second vehicle, determine whether the second vehicle presents a hazard based on the information received from the at least one sensor of the first vehicle, and transmit a notification alerting of the second vehicle if it is determined that the second vehicle presents a hazard. The notification may include identification information of the second vehicle.

According to an exemplary embodiment, the controller 101 of the apparatus for detecting a hazardous vehicle 100 is configured to the determine whether the second vehicle presents the hazard based on a weighted average of the at least one from among information corresponding to lane position of a second vehicle, information corresponding to a speed of a second vehicle, information corresponding to a vigilance of a second vehicle, and information corresponding to a performance of a driver of a second vehicle. The weights may include weights determined based on a dynamic weighted time scale (e.g., weights that depend on a situation and a time period).

The controller 101 may also be configured to control to output a notification notifying of the hazard of the second vehicle to a device, receive an input from the device indicating whether to contact authorities, and transmit a notification notifying of the hazard of the second vehicle to the authorities if the input requests that the authorities be contacted.

The controller 101 may also be configured to control to make an evasive maneuver or avoid a potential hazard. For example, the controller 101 may control to increase a gap or distance from the potential hazard or take a route that avoids the potential hazard.

Figure 2:
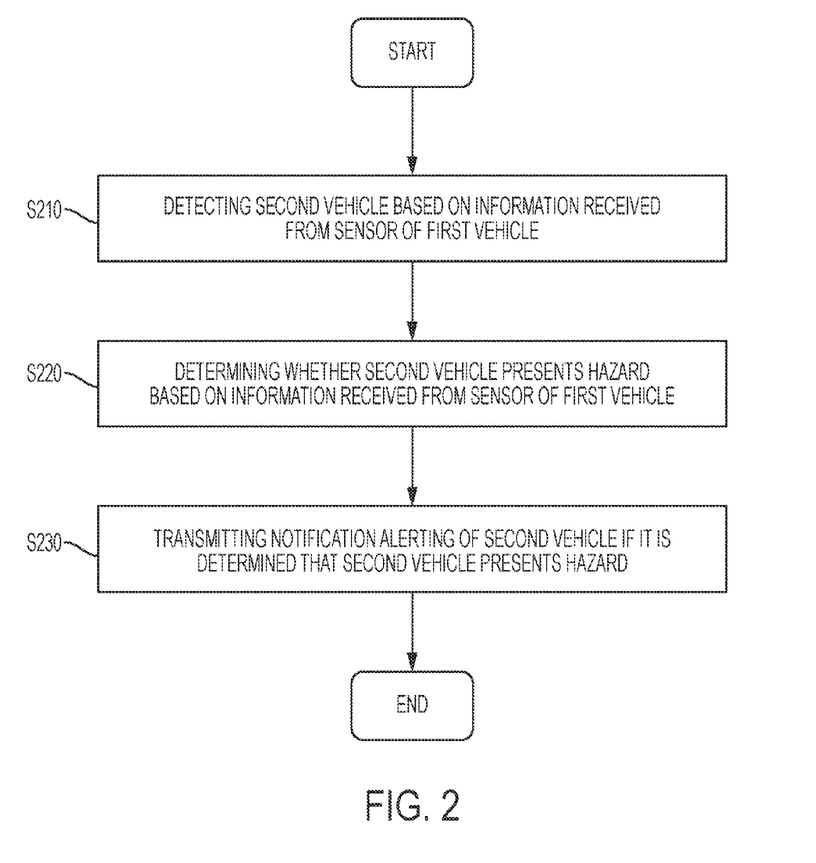
FIG. 2 shows a flowchart for a method of detecting a hazardous vehicle according to an aspect of an exemplary embodiment.

FIG. 2 shows a flowchart for a method for detecting a hazardous vehicle according to an exemplary embodiment. The method of FIG. 2 may be performed by the apparatus for detecting a hazardous vehicle 100 or may be encoded into a computer readable medium as instructions that are executable by a computer to perform the method.

Referring to FIG. 2, a second vehicle is detected based on information received from a sensor of the first vehicle in operation S210. It is then determined whether second vehicle presents a hazard based on information received from the sensor of the first vehicle in operation S220. In operation S230, a notification alerting of the second vehicle is transmitted if it is determined that the second vehicle presents hazard.

Figure 3:
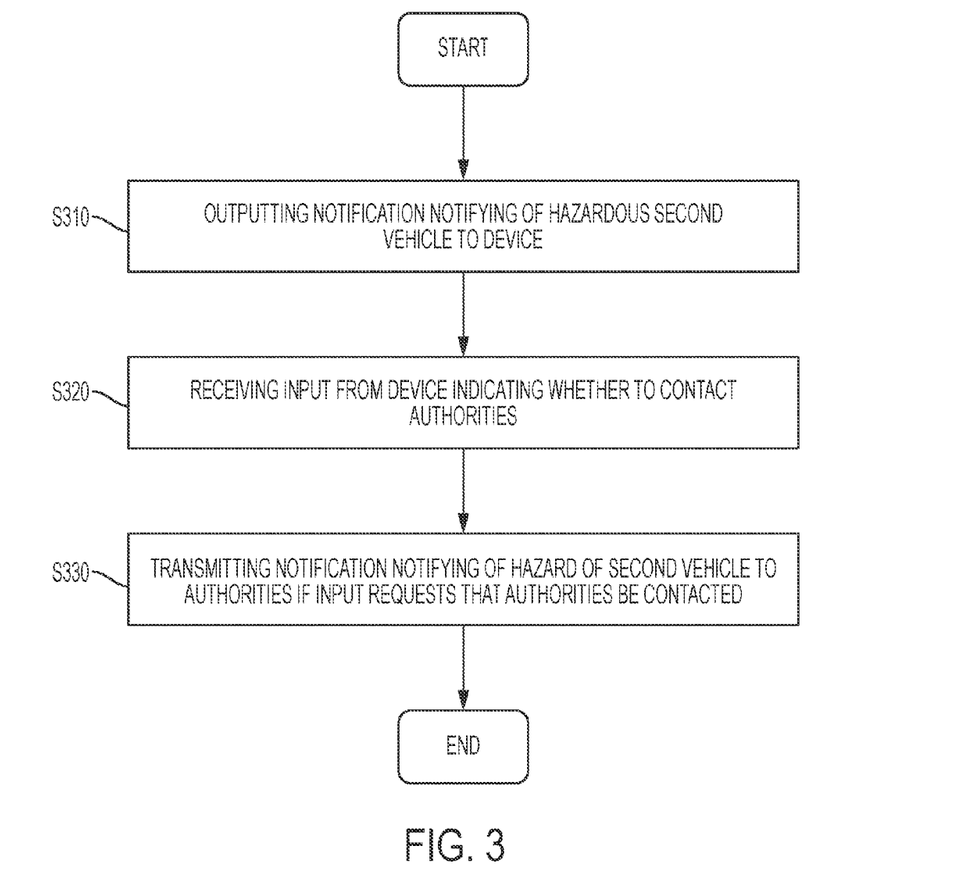
FIG. 3 shows a flowchart for transmitting a notification of a hazardous vehicle according to an aspect of an exemplary embodiment.

FIG. 3 shows a flowchart for transmitting a notification of a hazardous vehicle according to an aspect of an exemplary embodiment. The method of FIG. 3 may be performed by the apparatus for detecting a hazardous vehicle 100 or may be encoded into a computer readable medium as instructions that are executable by a computer to perform the method.

Referring to FIG. 3, a notification notifying of the hazard of the second vehicle is output to a device in operation S310. For example, a display notification may be output to a center sole display or instrument cluster display in a vehicle, or to a mobile device display in operation S310.

In operation S320, an input indicating whether to contact authorities is received from the device. For example, a user may use an input device to input a command to contact authorities or select the appropriate authorities to contact. Then, a notification notifying of the hazard of the second vehicle is transmitted to authorities in operation S330 if the input received in operation 320 requests that authorities be contacted.

Figure 4:
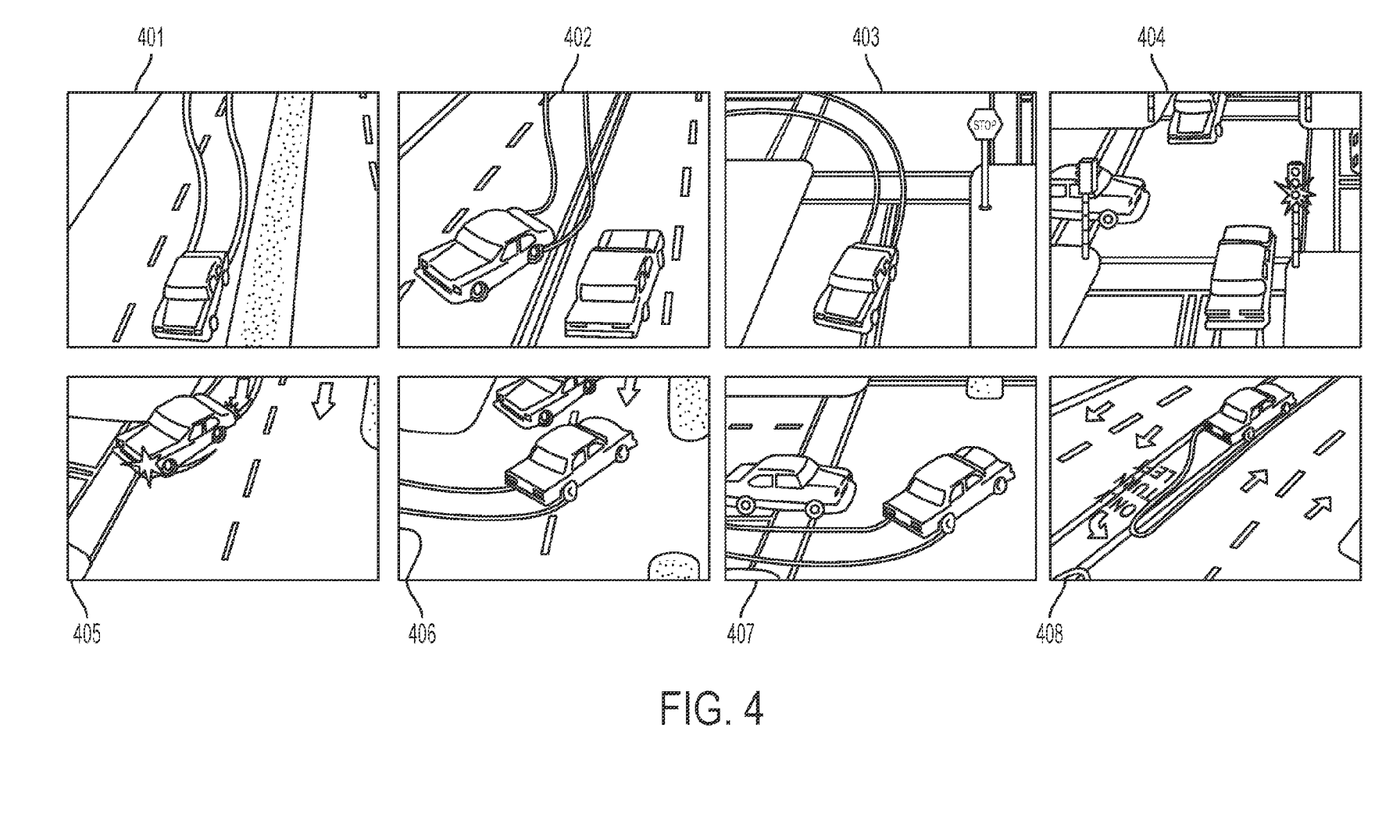
FIG. 4 shows an illustration of the types of hazardous vehicle actions according to an aspect of an exemplary embodiment.

FIG. 4 shows an illustration of the types of hazardous vehicle actions to an aspect of an exemplary embodiment. Referring to FIG. 4, illustration 401 is an example of a second vehicle that is drifting, illustration 402 is an example of a second vehicle swerving, illustration 403 is an example of a second vehicle turning with a wider turning radius than is normal or safe, illustration 404 is an example of a second vehicle stopping beyond a stopping limit line, illustration 405 is an example of a second vehicle signaling left and turning right or signaling inconsistent with driving behavior, illustration 406 is an example of a second vehicle driving into opposing or crossing traffic or opposite a designated direction of traffic, illustration 407 is an example of a second vehicle performing an improper left turn from a right lane, illustration 408 is an example of a second vehicle driving in a center lane or outside a designated roadway. Illustrations 401-408 are just some examples of types of hazardous driving behaviors by a second vehicle that could be detected by external sensors of a first vehicle and trigger a notification to be transmitted to appropriate authorities, and many more may be determined from information received from the external sensors on the first vehicle.

Figure 5:
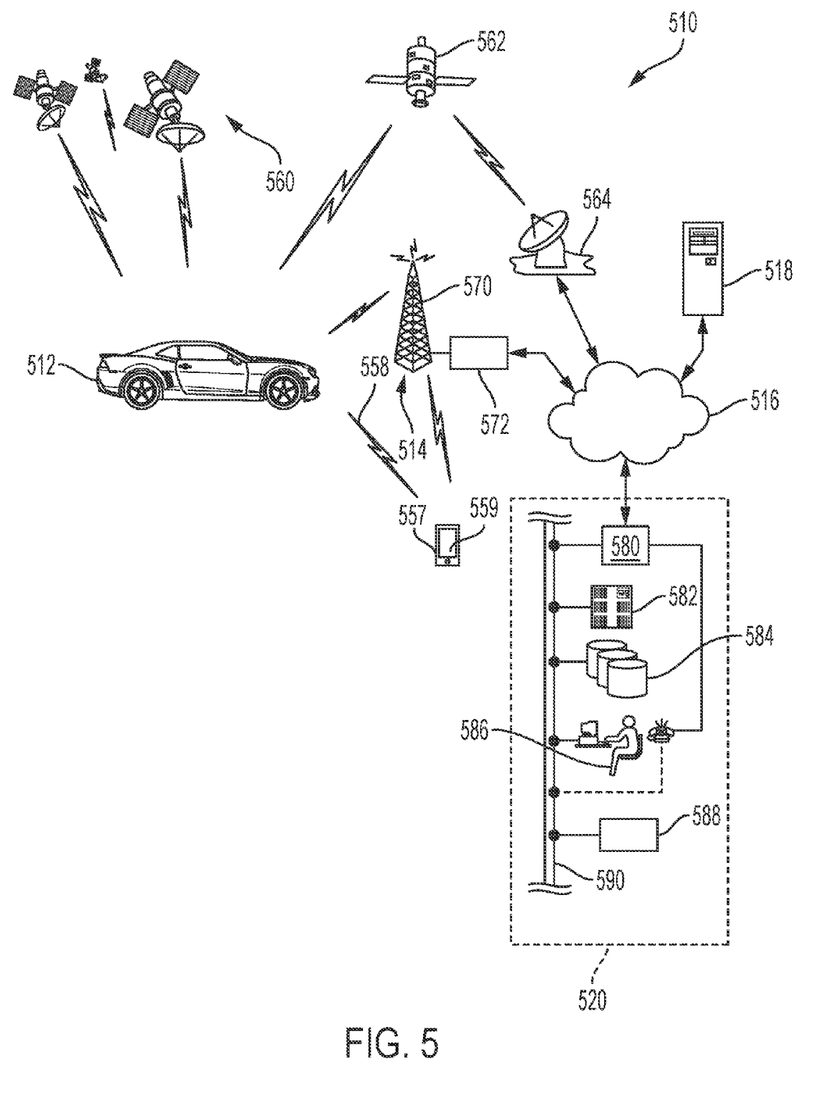
FIG. 5 shows a diagram of an operating environment of an apparatus that detects hazardous vehicles according to an aspect of an exemplary embodiment.

FIG. 5 shows an illustration of an operating environment that comprises a mobile vehicle communications system 510 and that can be used to implement the apparatus and the method for detecting a hazardous vehicle disclosed herein.

Referring to FIG. 5, an operating environment that comprises a mobile vehicle communications system 510 and that can be used to implement apparatus and the method for detecting a hazardous vehicle is shown. Communications system 510 may include one or more from among a vehicle 512, one or more wireless carrier systems 514, a land communications network 516, a computer 518, and a call center 520. It should be understood that the disclosed apparatus and the method for detecting a hazardous vehicle can be used with any number of different systems and is not specifically limited to the operating environment shown here. The following paragraphs simply provide a brief overview of one such communications system 510; however, other systems not shown here could employ the disclosed apparatus and the method for detecting a hazardous vehicle as well.

Vehicle 512 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. One or more elements of apparatus for detecting a hazardous vehicle 100 shown in FIG. 1 may be incorporated into vehicle 512.

One of the networked devices that can communicate with the communication device 108 is a wireless device, such as a smart phone 557. The smart phone 557 can include computer processing capability, a transceiver capable of communicating using a short-range wireless protocol 558, and a visual smart phone display 559. In some implementations, the smart phone display 559 also includes a touch-screen graphical user interface and/or a GPS module capable of receiving GPS satellite signals and generating GPS coordinates based on those signals. One or more elements of apparatus for detecting a hazardous vehicle 100 shown in FIG. 1 may be incorporated into smart phone 557.

The GPS module of the communication device 108 may receive radio signals from a constellation 560 of GPS satellites, recognize a location of a vehicle based on the on board map details or by a point of interest or a landmark. From these signals the communication device 108 can determine vehicle position that is used for providing navigation and other position-related services to the vehicle driver. Navigation information can be presented by the output 104 (or other display within the vehicle) or can be presented verbally such as is done when supplying turn-by-turn navigation. The navigation services can be provided using a dedicated in-vehicle navigation module, or some or all navigation services can be done via the communication device 108. Position information may be sent to a remote location for purposes of providing the vehicle with navigation maps, map annotations (points of interest, restaurants, etc.), route calculations, and the like. The position information can be supplied to call center 520 or other remote computer system, such as computer 518, for other purposes, such as fleet management. Moreover, new or updated map data can be downloaded by the communication device from the call center 520.

The vehicle 512 may include vehicle system modules (VSMs) in the form of electronic hardware components that are located throughout the vehicle and typically receive input from one or more sensors and use the sensed input to perform diagnostic, monitoring, control, reporting and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions. As examples, one VSM can be an engine control module (ECM) that controls various aspects of engine operation such as fuel ignition and ignition timing, another VSM can be an external sensor module configured to receive information from external sensors such as cameras, radars, LIDARs, and lasers, another VSM can be a powertrain control module that regulates operation of one or more components of the vehicle powertrain, and another VSM can be a body control module that governs various electrical components located throughout the vehicle, like the vehicle's power door locks and headlights. According to an exemplary embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 512, as numerous others are also available.

Wireless carrier system 514 may be a cellular telephone system that includes a plurality of cell towers 570 (only one shown), one or more mobile switching centers (MSCs) 572, as well as any other networking components required to connect wireless carrier system 514 with land network 516. Each cell tower 570 includes sending and receiving antennas and a base station, with the base stations from different cell towers being connected to the MSC 572 either directly or via intermediary equipment such as a base station controller. Cellular system 514 can implement any suitable communications technology, including for example, analog technologies such as AMPS, or the newer digital technologies such as CDMA (e.g., CDMA2000 or 1xEVDO) or GSM/GPRS (e.g., 4G LTE). As will be appreciated by those skilled in the art, various cell tower/base station/MSC arrangements are possible and could be used with wireless system 514. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 514, a different wireless carrier system in the form of satellite communication can be used to provide uni-directional or bi-directional communication with the vehicle. This can be done using one or more communication satellites 562 and an uplink transmitting station 564. Uni-directional communication can be, for example, satellite radio services, wherein programming content (news, music, etc.) is received by transmitting station 564, packaged for upload, and then sent to the satellite 562, which broadcasts the programming to subscribers. Bi-directional communication can be, for example, satellite telephony services using satellite 562 to relay telephone communications between the vehicle 512 and station 564. If used, this satellite telephony can be utilized either in addition to or in lieu of wireless carrier system 514.

Land network 516 may be a land-based telecommunications network that is connected to one or more landline telephones and connects wireless carrier system 514 to call center 520. For example, land network 516 may include a public switched telephone network (PSTN) such as that used to provide hardwired telephony, packet-switched data communications, and the Internet infrastructure. One or more segments of land network 516 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 520 need not be connected via land network 516, but could include wireless telephony equipment so that it can communicate directly with a wireless network, such as wireless carrier system 514.

Computer 518 can be one of a number of computers accessible via a private or public network such as the Internet. Each such computer 518 can be used for one or more purposes, such as a web server accessible by the vehicle via the communication device 108 and wireless carrier 514. Other such accessible computers 518 can be, for example: a service center computer where diagnostic information and other vehicle data can be uploaded from the vehicle via the communication device 108; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 512 or call center 520, or both. A computer 518 can also be used for providing Internet connectivity such as DNS services or as a network address server that uses DHCP or other suitable protocol to assign an IP address to the vehicle 512.

Call center 520 is designed to provide the vehicle electronics with a number of different system back-end functions and, according to the exemplary embodiment shown here, generally includes one or more switches 580, servers 582, databases 584, live advisors 586, as well as an automated voice response system (VRS) 588. These various call center components may be coupled to one another via a wired or wireless local area network 590. Switch 580, which can be a private branch exchange (PBX) switch, routes incoming signals so that voice transmissions are usually sent to either the live adviser 586 by regular phone or to the automated voice response system 588 using VoIP. The live advisor phone can also use VoIP as indicated by the broken line in FIG. 5. VoIP and other data communication through the switch 580 is implemented via a modem (not shown) connected between the switch 580 and network 590. Data transmissions are passed via the modem to server 582 and/or database 584. Database 584 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 520 using live advisor 586, it will be appreciated that the call center can instead utilize VRS 588 as an automated advisor or, a combination of VRS 588 and the live advisor 586 can be used.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for detecting a hazardous vehicle, the method comprising:
   detecting a second vehicle based on information received from at least one sensor of a first vehicle;
   determining whether the second vehicle presents a hazard based on a weighted average determined from a dynamic weighted time scale of the information received from the at least one sensor of the first vehicle, the information including information corresponding to a lane position of a second vehicle, information corresponding to a speed and a braking of a second vehicle, information corresponding to a vigilance of a second vehicle, and information corresponding to a performance of a driver of a second vehicle; and
   transmitting a notification alerting of the second vehicle if it is determined that the second vehicle presents a hazard.

2. The method of claim 1, wherein the information corresponding to lane position of the second vehicle includes information on at least one from among weaving of a second vehicle, weaving across lines by a second vehicle, straddling a line by a second vehicle, swerving by a second vehicle, a wide radius turn by a second vehicle, drifting by a second vehicle and near collisions by a second vehicle.

3. The method of claim 1, wherein the information corresponding to the speed and the braking of the second vehicle includes information on at least one from among stopping positions of a second vehicle, acceleration and deceleration of a second vehicle, speed variance of a second vehicle, a difference between a speed of a second vehicle and a posted speed limit.

4. The method of claim 1, wherein the information corresponding to the vigilance of the second vehicle includes information on at least one from among a response time of a second vehicle to a traffic control device, a status of lights of a second vehicle at a time of a day, signaling by a second vehicle, and a direction of travel relative to a posted direction of travel.

5. The method of claim 1, wherein the information corresponding to the performance of the driver of the second vehicle includes information on at least one from among a distance between a second vehicle and a third vehicle, illegal turns by a second vehicle, and a path of a second vehicle.

6. The method of claim 1, wherein the transmitting the notification alerting of the second vehicle comprises:
   outputting a notification notifying of the hazard of the second vehicle to a device;
   receiving an input from the device indicating whether to contact authorities; and
   transmitting a notification notifying of the hazard of the second vehicle to the authorities if the input requests that the authorities be contacted.

7. The method of claim 1, wherein the transmitting the notification alerting of the second vehicle comprises transmitting a notification alerting of the hazard of the second vehicle to appropriate authorities.

8. The method of claim 1, wherein the information corresponding to lane position of the second vehicle includes information on at least one from among weaving of a second vehicle, weaving across lines by a second vehicle, straddling a line by a second vehicle, swerving by a second vehicle, a wide radius turn by a second vehicle, drifting by a second vehicle and near collisions by a second vehicle,
   wherein the information corresponding to the speed and the braking of the second vehicle includes information on at least one from among stopping positions of a second vehicle, acceleration and deceleration of a second vehicle, speed variance of a second vehicle, a difference between a speed of a second vehicle and a posted speed limit,
   wherein the information corresponding to the vigilance of the second vehicle includes information on at least one from among a response time of a second vehicle to a traffic control device, a status of lights of a second vehicle at a time of a day, signaling by a second vehicle, and a direction of travel relative to a posted direction of travel, and wherein the information corresponding to the performance of the driver of the second vehicle includes information on at least one from among a distance between a second vehicle and a third vehicle, illegal turns by a second vehicle, and a path of a second vehicle.

9. An apparatus for detecting a hazardous vehicle, the apparatus comprising:
at least one memory comprising computer executable instructions; and
at least one processor configured to read and execute the computer executable instructions, the computer executable instructions causing the at least one processor to:
detect a second vehicle based on information received from at least one sensor of a first vehicle;
determine whether the second vehicle presents a hazard based on a weighted average determined from a dynamic weighted time scale of the information received from the at least one sensor of the first vehicle, the information including information corresponding to a lane position of a second vehicle, information corresponding to a speed and a braking of a second vehicle, information corresponding to a vigilance of a second vehicle, and information corresponding to a performance of a driver of a second vehicle; and
transmit a notification alerting of the second vehicle if it is determined that the second vehicle presents a hazard.

10. The apparatus of claim 9, wherein the information corresponding to lane position of the second vehicle includes information on at least one from among weaving of a second vehicle, weaving across lines by a second vehicle, straddling a line by a second vehicle, swerving by a second vehicle, a wide radius turn by a second vehicle, drifting by a second vehicle and near collisions by a second vehicle.

11. The apparatus of claim 10, wherein the information corresponding to the speed and the braking of the second vehicle includes information on at least one from among stopping positions of a second vehicle, acceleration and deceleration of a second vehicle, speed variance of a second vehicle, a difference between a speed of a second vehicle and a posted speed limit.

12. The apparatus of claim 10, wherein the information corresponding to the vigilance of the second vehicle includes information on at least one from among a response time of a second vehicle to a traffic control device, a status of lights of a second vehicle at a time of a day, signaling by a second vehicle, and a direction of travel relative to a posted direction of travel.

13. The apparatus of claim 10, wherein the information corresponding to the performance of the driver of the second vehicle includes information on at least one from among a distance between a second vehicle and a third vehicle, illegal turns by a second vehicle, and a path of a second vehicle.

14. The apparatus of claim 10, wherein the computer executable instructions cause the at least one processor to transmit the notification alerting of the second vehicle by:
outputting a notification notifying of the hazard of the second vehicle to a device;
receiving an input from the device indicating whether to contact authorities; and
transmitting a notification notifying of the hazard of the second vehicle to the authorities if the input requests that the authorities be contacted.

15. The apparatus of claim 10, wherein the computer executable instructions cause the at least one processor to transmit the notification alerting of the second vehicle by transmitting a notification alerting of the hazard of the second vehicle to authorities.

16. The apparatus of claim 10, further comprising the at least one sensor,
wherein the at least one sensor comprises at least one from among at least one camera, a radar, a LIDAR, and a laser sensor.

17. The apparatus of claim 10, wherein the information corresponding to lane position of the second vehicle includes information on at least one from among weaving of a second vehicle, weaving across lines by a second vehicle, straddling a line by a second vehicle, swerving by a second vehicle, a wide radius turn by a second vehicle, drifting by a second vehicle and near collisions by a second vehicle,
wherein the information corresponding to the speed and the braking of the second vehicle includes information on at least one from among stopping positions of a second vehicle, acceleration and deceleration of a second vehicle, speed variance of a second vehicle, a difference between a speed of a second vehicle and a posted speed limit,
wherein the information corresponding to the vigilance of the second vehicle includes information on at least one from among a response time of a second vehicle to a traffic control device, a status of lights of a second vehicle at a time of a day, signaling by a second vehicle, and a direction of travel relative to a posted direction of travel, and
wherein the information corresponding to the performance of the driver of the second vehicle includes information on at least one from among a distance between a second vehicle and a third vehicle, illegal turns by a second vehicle, and a path of a second vehicle.

18. A non-transitory computer readable medium comprising computer executable instructions executable by a processor to perform a method for detecting a hazardous vehicle, the method comprising:
detecting a second vehicle based on information received from at least one sensor of a first vehicle;
detecting identification information of the second vehicle;
determining whether the second vehicle presents a hazard based on a weighted average determined from a dynamic weighted time scale of the information received from the at least one sensor of the first vehicle, the information including information corresponding to a lane position of a second vehicle, information corresponding to a speed and a braking of a second vehicle, information corresponding to a vigilance of a second vehicle, and information corresponding to a performance of a driver of a second vehicle; and
transmitting a notification alerting of the second vehicle if it is determined that the second vehicle presents a hazard, the notification including identification information of the second vehicle.

19. The non-transitory computer readable medium of claim 16, wherein the information corresponding to lane position of the second vehicle includes information on at least one from among weaving of a second vehicle, weaving across lines by a second vehicle, straddling a line by a second vehicle, swerving by a second vehicle, a wide radius turn by a second vehicle, drifting by a second vehicle and near collisions by a second vehicle, wherein the information corresponding to the speed and the braking of the second vehicle includes information on at least one from among stopping positions of a second vehicle, acceleration and deceleration of a second vehicle, speed variance of a second vehicle, a difference between a speed of a second vehicle and a posted speed limit, wherein the information corresponding to the vigilance of the second vehicle includes information on at least one from among a response time of a second vehicle to a traffic control device, a status of lights of a second vehicle at a time of a day, signaling by a second vehicle, and a direction of travel relative to a posted direction of travel, and wherein the information corresponding to the performance of the driver of the second vehicle includes information on at least one from among a distance between a second vehicle and a third vehicle, illegal turns by a second vehicle, and a path of a second vehicle.

\* \* \* \* \*